United States Patent [19]

Lodetti

[11] Patent Number: 5,428,200
[45] Date of Patent: Jun. 27, 1995

[54] APPARATUS FOR ELECTRO-EROSION CUTTING

[75] Inventor: Attilio Lodetti, Losone, Switzerland

[73] Assignee: A.G. für Industrielle Elektronik AGIE, Losone, Switzerland

[21] Appl. No.: 111,133

[22] Filed: Aug. 24, 1993

[30] Foreign Application Priority Data

Aug. 26, 1992 [DE] Germany .................. 42 28 331.0

[51] Int. Cl.⁶ .............................................. B23H 7/10
[52] U.S. Cl. ................................................. 219/69.12
[58] Field of Search ..................................... 219/69.12

[56] References Cited

U.S. PATENT DOCUMENTS

| 4,638,140 | 1/1987 | Obara et al. | 219/69.12 |
| 4,883,933 | 11/1989 | Yatomi et al. | 219/69.12 |
| 5,162,630 | 11/1992 | Iwasaki | 219/69.12 |

FOREIGN PATENT DOCUMENTS

| 0246332 | 11/1987 | European Pat. Off. | |
| 0312056 | 10/1988 | European Pat. Off. | |
| 3126444 | 7/1981 | Germany | |
| 3926972 | 8/1989 | Germany | |
| 58-186534 | 10/1983 | Japan | 219/69.12 |
| 60-62420 | 4/1985 | Japan | 219/69.12 |
| 0655884 | 4/1984 | Switzerland | |

Primary Examiner—Geoffrey S. Evans
Attorney, Agent, or Firm—Egli International; Christa Hildebrand

[57] ABSTRACT

Apparatus for electro-erosive cutting. A cathode in the form of a wire advances through at least one wire guide, with one guide being upstream and the other, if any, downstream of the workpiece in terms of the direction advanced by the wire. The at least one wire guide is an open, specifically a notched, wire guide, one that does not surround the wire, that is, and has associated with it a closed wire guide, specifically a wire guide in the from of a torus that surrounds the wire.

14 Claims, 3 Drawing Sheets

APPARATUS FOR ELECTRO-EROSION CUTTING

BACKGROUND OF THE INVENTION

The present invention concerns apparatus for electro-erosive cutting. A cathode in the form of a wire advances through at least one wire guide, with one guide being upstream and the other, if any, downstream of the workpiece in terms of the direction advanced by the wire.

Many types of apparatus, machinery, and systems for electro-erosive cutting are known. The basic apparatus usually comprises a stand with transmissions and wiring, a rinsing system, a generator, and numerical or computerized numerical controls. A cathode in the form of a wire cuts a blank out of the workpiece, which constitutes the anode, starting with an already drilled opening or reference point.

In the working zone (the erosion zone), the speed of and tension on the wire are prescribed and regulated. The aforesaid wire guide or guides ensure that the wire is at least extensively precisely positioned. The guides are usually accommodated in what are called wire-guide heads.

There is in the field of electro-erosive cutting a particular need for wire guides that can be used to cut at a conical angle to the normal. This need applies especially to wire guides accommodated in stationary heads. Definite limitations have been demonstrated for cutting at angles of 0° to 45°. Although the problem is not as serious when the wire-guide heads rotate, rotating heads are more expensive.

SUMMARY OF THE INVENTION

The object of the present invention is improved apparatus for electro-erosive cutting, especially for cutting at conical angles.

This object is attained in that at least one wire guide is an open, specifically a notched, wire guide, one that does not surround the wire, and has associated with it a closed wire guide, specifically a wire guide in the from of a torus that surrounds the wire. The open wire guide will precisely position the wire while it is cutting at an acute conical angle or straight up and down. At more obtuse conical angles the closed wire guide will assume guidance of the wire, which will not slip out of it at a more obtuse angle.

Both open wire guides, which have notches, and closed wire guides, which are toruses, are in themselves known. Combining an open wire guide with a closed wire guide and the advantages to be derived from so doing, however, are not yet known. It may even at first seem contradictory to one of skill in the art to accommodate to advantage two wire guides instead of one on each side of the workpiece. The apparent contradiction, however, will resolve itself as soon as the results ensured by the present invention are recognized, because it actually exploits the advantages of both open and closed wire guides while avoiding the problems encountered when either type is employed alone.

DESCRIPTION OF THE PREFERRED EMBODIMENTS

This fact will be evident from the following description of various versions of the invention. The closed wire guide in one preferred embodiment of the invention is in the form of a torus. Toruses are relatively cost-effective and, due to their symmetry, allow precise positioning of the wire when cuts are performed at an obtuse conical angle.

There are in another preferred embodiment of the invention at least two closed wire guides on each side of the workpiece and between the workpiece and the open wire guide. It is of course also possible for simple versions of the invention to have the combination of open and closed wire guides on only one side of the workpiece. Still, the invention will be most effective with the same arrangement on each side of the workpiece. It is also of advantage for the open and closed wire guide or guides to be accommodated in a single wireguide head. Such a system is, however, only slightly more complicated and expensive than known systems.

Another preferred embodiment of the invention is characterized by a wire-position sensor. Wire-position sensors are manufactured by AGIE (Aktiengesellschaft für Industrielle Elektronik) for example and are accordingly known. Such a wire-position sensor will be most effective when accommodated between the open wire guide and the closed wire guide. Although the wire-position sensor has many overall advantages (described for instance in European Patent 0 312 056), its main purpose in the present invention is to precisely position the wire at the transition between the open and the closed wire guide. It can be employed with existing or with only slightly modified software.

Another preferred embodiment of the invention is characterized by a wire threader, especially a water-jet wire threader. The major advantage of open wire guides over closed wire guides is that they can accept wires of any thickness with no need to replace the whole wire-guide head. For the wire to be precisely positioned accordingly, the opening through the center of the torus must be approximately as wide as the wire is thick.

An open wire guide is accordingly much easier to thread wire through automatically, and contemporary electro-erosive cutting demands at least extensively automatic threading of the wire from the first wire-guide head, which is usually at the top of the apparatus, through a starting bore drilled through the workpiece, and finally to the other wire-guide head. Wires are usually threaded through open wire guides in a hollow jet of water that functions like a needle. The jet entrains the wire, which unrolls from a reel, from the top of the apparatus to the bottom.

A jet cannot, however, be employed with an open wire guide when the opening through the center is too small (0.03–0.33 mm, depending on the wire) and other approaches to threading must be resorted to.

It is possible for example to heat the wire, pull it in two, and thread it by moving the upper wire-guide head in the z direction and pumping water from the lower wire-guide head.

Sometimes the wire is threaded with a tube, through which the wire is thrust from top to bottom.

The present invention is useful from this aspect as well in that it allows known water-jet wire threaders to be employed. Since the open wire guides ensure precise positioning of the wire while cuts are being cut at acute conical angles, the opening through the center of the toruses can be wide enough to accommodate water-jet wire threading.

Another advantage of the aforesaid water-jet wire threading with open wire guide (which are also manufactured by AGIE for instance) is that aside from the appropriately designed wire-guide heads, it require no additional devices. Furthermore, it requires no special maneuvering of the wire, and is also perfectly reliable.

It is preferable for the opening through the center of the closed wire guide to be at least twice as wide as the wire is thick. It is even more ideal for the opening through the center of the closed wire guide to be 10 times as wide as the wire is thick. It is most preferable, however, for the opening through the center of the closed wire guide to be approximately 2.5 mm wide, which is more or less 10 times as wide as the most commonly employed wire is thick, approximately 0.3 min. Wires can reliably be threaded through such toruses with a water-jet wire threader.

The open wire guides are far enough from the closed wire guides in another preferred embodiment of the invention for the wire to be guided by the open wire guides while the cut is being performed at conical angles of up to approximately 2° and by the closed wire guides at more obtuse conical angles. This feature implies of course that the higher-precision notch in the open wire guides will assume guidance of the wire when the cut is vertical, meaning that it is being cut at a conical angle of 0°. Since the closed wire guides come into action when the conical angle is more obtuse, the wire-guide heads will not need to rotate, which lowers manufacturing costs.

In summary, the present invention provides the following advantages in particular. First, it is no longer necessary to discontinue operations in order to replace the wire guides when a wire with a different thickness is going to be employed. Second, capital investment is lower because it is no longer necessary to tilt the wire-guide heads when a cut is being performed at a conical angle with an open wire guide. Finally, the overall operation will be more reliable because no extra wire-threading steps are necessary.

Further preferred characteristics and advantages of the invention will be evident from the following specification of preferred embodiments. The embodiments are schematically represented in the accompanying drawing, which also illustrate differences between the present invention and the state of the art.

BRIEF DESCRIPTION OF THE DRAWINGS

The invention will now be specified with reference to the drawing, wherein.

The figures are not necessarily to scale.

DESCRIPTION OF THE DRAWINGS

The terminology employed hereinafter is intended to facilitate comprehension of the present invention without limiting it in any way. The terms "top," "bottom," "narrower," and "wider" in particular are to be understood as referring to apparatus of conventional orientation and size and to conventionally mounted workpiece.

Figure 1:
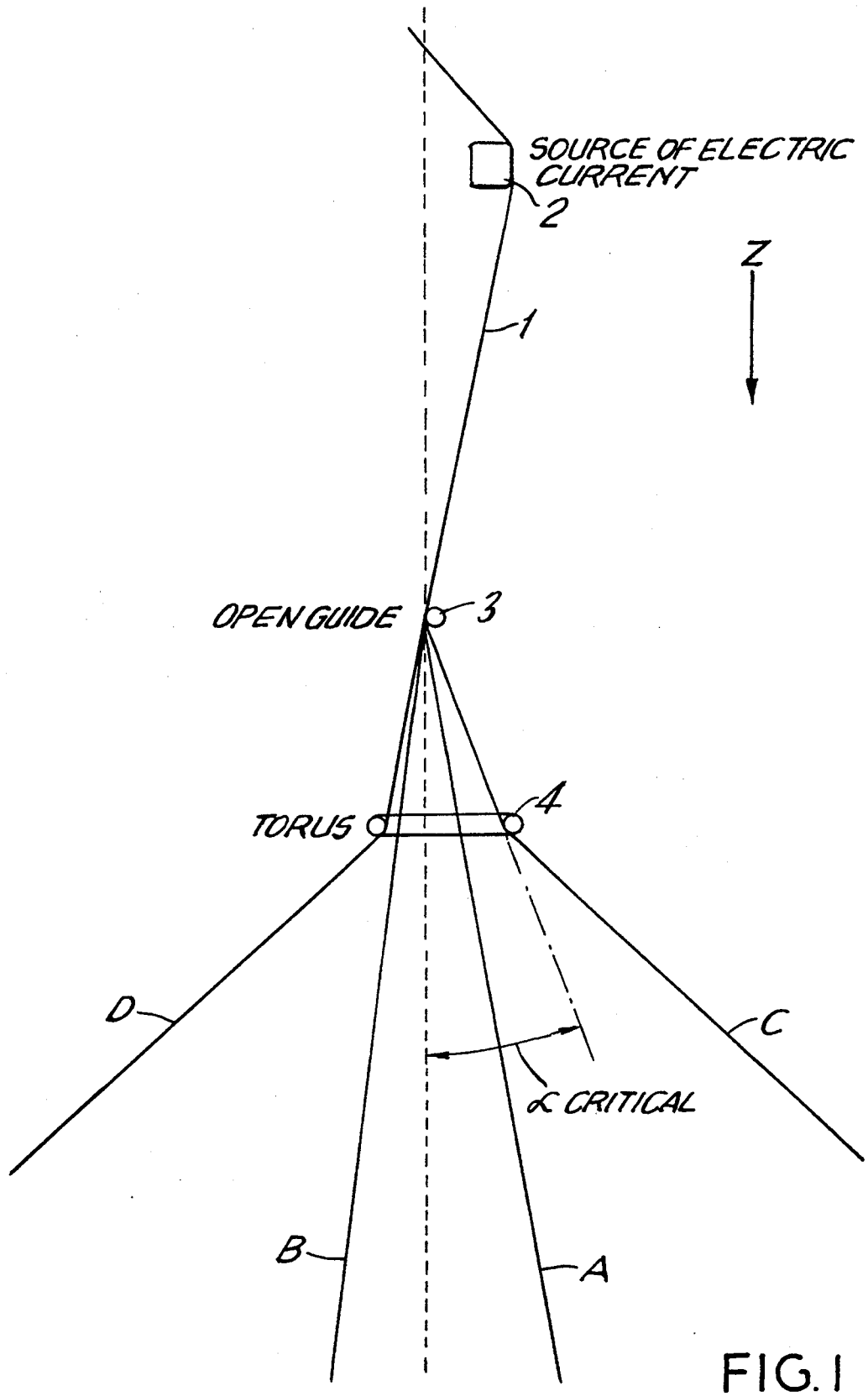
FIG. 1 is a schematic section through a combination of open (notched) wire guide and closed wire guide (torus) in accordance with the invention.

FIG. 1 is a highly schematic illustration of the components essential to the present invention of a wire-guide head in apparatus for electro-erosive machining. Basic elements of such apparatus, like the stand with its transmissions and wiring, rinsing system, generator, and computerized numerical controls are considered to be in-themselves known and are accordingly not specified.

A cathode in the form of a wire 1 is unrolled and advanced through the apparatus in the direction indicated by arrow Z, usually from top to bottom. A source 2 of electric current conventionally supplies pulses from an unillustrated generator. Source 2 also forces wire 1 out of the vertical, represented by the broken line. Downstream of source 2 of electric current in terms of direction Z is an open, or notched, wire guide 3.

The untensioned wire, which would descend along the vertical represented by the broken line, would be as far as possible inside the notch in open wire guide 3, which is represented here in section through the base of the notch. Downstream of open wire guide 3 is a closed wire guide 4, a wire guide in the form of a torus, that is. It is in this sense that the closed wire guide is "associated" with the open wire guide as recited in claim 1 herein.

Open wire guide 3 will guide the wire while cutting at a conical angle $\alpha$ more acute than a specific threshold $\alpha_{critical}$ (2° for instance) to the vertical represented by the broken line. At such acute angles (represented by lines A and B e.g.) the tension on the wire will prevent it from slipping out of an open wire guide even if the head that accommodates it does not rotate. At more obtuse conical angles (represented by lines C and D) on the other hand the closed wire guide will assume guidance of the wire.

Figure 2:
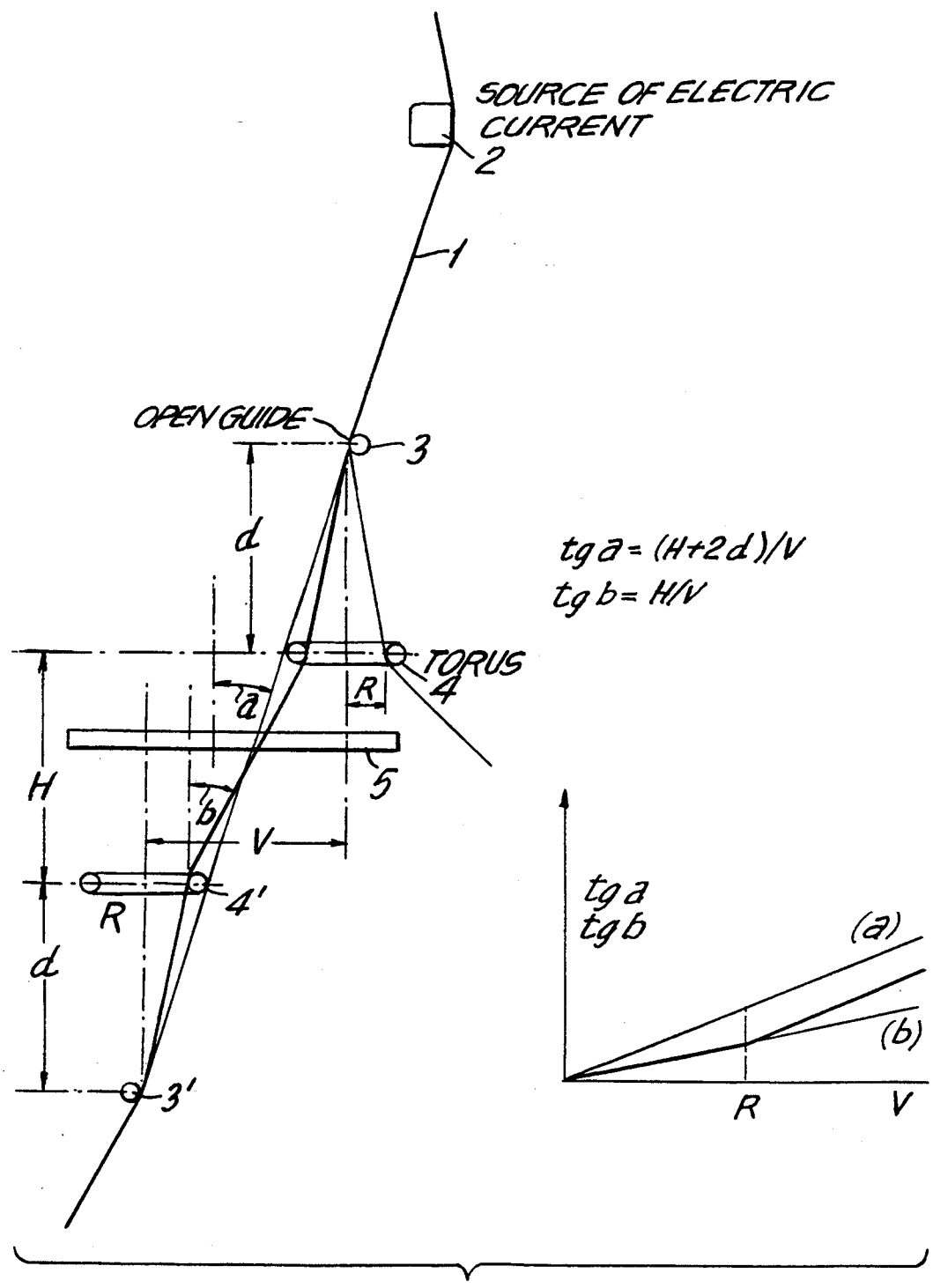
FIG. 2 is a schematic section through a combination of open (notched) wire guide and closed wire guide (torus) in accordance with the invention on each side of the workpiece.

How the invention works will be particularly evident from FIG. 2. FIG. 2 illustrates a combination of open, or notched, wire guide 3 and 3' and closed wire guide 4 and 4', or torus, on each side of workpiece 5. Wire 1 will not be able to slip out of closed wire guides 4 and 4' while it is cutting at an obtuse conical angle. At more acute conical angles, at angles, more precisely, more acute than the angle between a line through the most downstream point of wire contact upstream of closed wire guide 4 and 4' and a point on the circumference of the opening through the center of the torus on the one hand and a perpendicular through the center of the torus on the other, open wire guides 3 and 3' will assume guidance of wire 1. The wire will accordingly be secure even at very acute conical angles.

Figure 3:
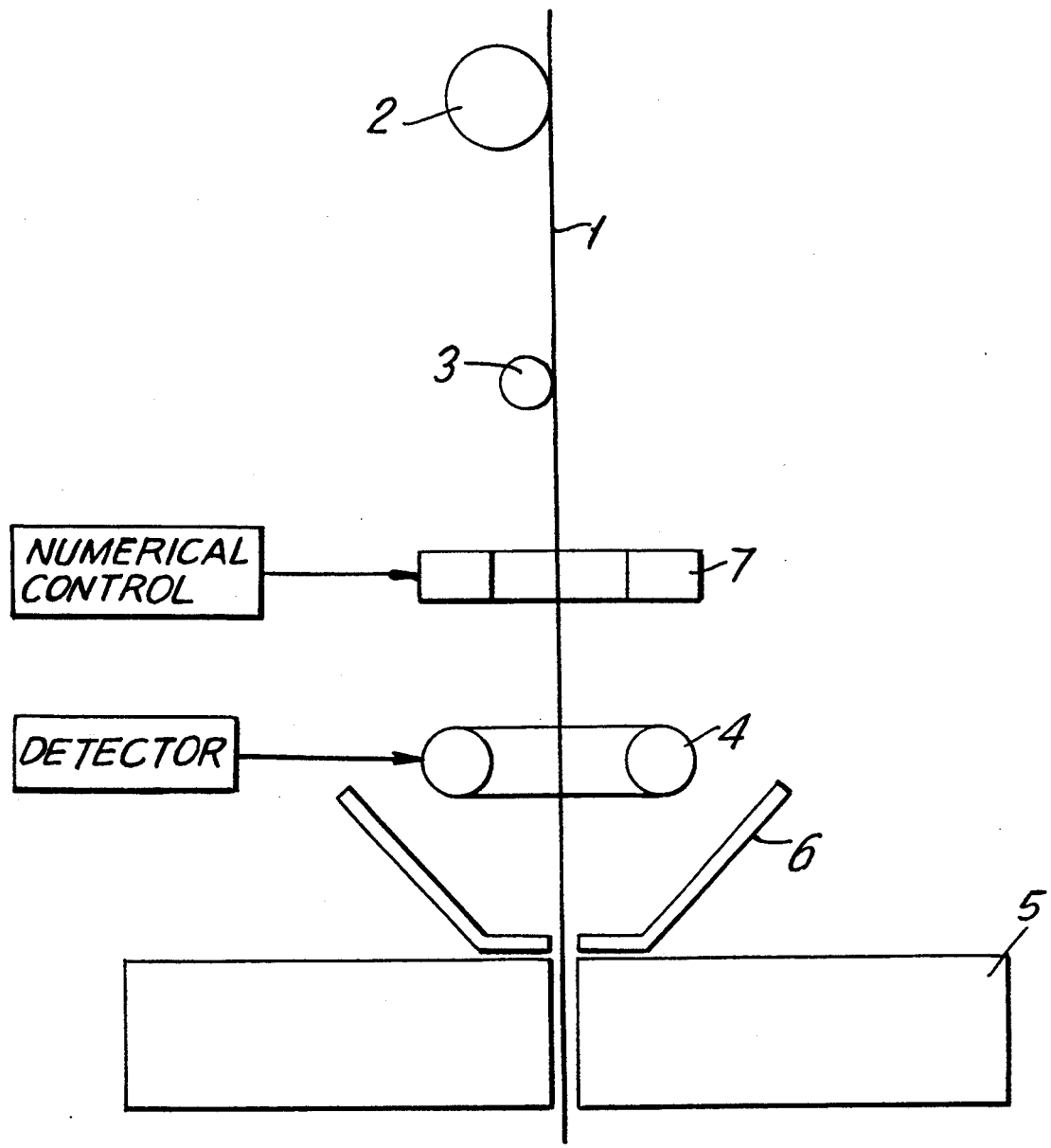
FIG. 3 is a schematic section through another embodiment of the invention.

Even more precision is afforded by the wire-position sensor 7 illustrated in FIG. 3. Wire-position sensor 7 specifically ensures precise wire guidance during the transition between guides. This transition occurs at a point V=R, wherein V is the distance between the perpendiculars through the center of each torus as illustrated in FIG. 2 and R is the radius of the opening through the center of the torus. The distance between the toruses in fact is shorter than the distance between the toruses and open wire guides 3 and 3' (distance 2d in FIG. 2, where d is the distance between a closed and an open wire guide). At point V=R, the function employed to calculate a conical angle from the displacement between upper wire guides 3 and 4 and lower wire guides 3' and 4' will discontinuously convert from the function arctan $[(H+2d)/V]$ to the function arctan $(H/V)$ and vice versa although strictly theoretically if the wire contact areas are treated as points or lines. Since the contact between the wire and the wire guide is never really a point, however, the transition is actually continuous. The area of contact can if necessary be monitored by wire-position sensor 7. Wire-position sensor 7 can also compensate for any slippages that accompany a change in the direction of the cut. The sensor can even enhance precision at more obtuse conical angles (when the torus is in action).

It is of advantage for the wire-deflection monitoring system with wire-position sensor 7 to be between upper wire guides 3 and 4.

As will be obvious from the foregoing formulas, the transition between open wire guides 3 and 3' at more acute conical angles and closed wire guides 4 and 4' at obtuse conical angles depends essentially on how far the open wire guide is from the closed wire guide. The dependence of the conical angle on distance d will be evident from FIG. 2. When open wire guide 3 or 3' approaches closed wire guide 4 or 4' in a sort of vertical parallel displacement while wire 1 is tensioned, the wire will automatically slope more steeply toward guide 3 or 3' through workpiece 5. The conical angle will accordingly become more acute as closed wire guide 4 or 4' approaches open wire guide 3 or 3'.

To compensate for this situation the computerized numerical controls are designed in accordance with the present invention to include distance d in their calculations of the conical angle and to make appropriate corrections. It is preferable for a detector of the type conventionally employed to confirm contact in electro-erosive cutting to confirm that wire 1 is in contact with closed wire guide 4 or 4'. The slope of wire 1 in relation to closed wire guide 4 or 4' can be derived therefrom and, if the constant axial position of that guide is known, the distance d between closed wire guide 4 or 4' and open wire guide 3 or 3' can be derived from the slope and forwarded to the computerized numerical controls. The controls will then make the requisite corrections for the desired conical angle.

It is of advantage to be able to utilize the results from wire-position sensor 7 to correct for the position of wire 1 in closed wire guide 4 or 4' to ensure that cuts at conical angles more obtuse than 2° will always remain as programmed, in conjunction with the correction software if necessary.

It has until now been necessary in order to precisely define the position of the wire in a closed wire guide for the opening through the center of the torus to be just slightly wider than the wire is thick. When a thicker or thinner wire is to be employed it is necessary to replace guide with one that fits the wire more snugly. This of course makes it more difficult to thread the wire automatically.

The present invention solves the automatic-threading problem by increasing the width of the opening through the center of the closed wire guide in relation to the thickness of the wire. It is possible to use the same water-jet system that has been used until now only with open wire guides. The openings are wide enough, at a diameter of 2.5 for example, to easily accept the jet.

FIG. 3 illustrates a wire-guide head 6 in accordance with the invention, in this case the head that is usually at the top of the apparatus. All the essential components, specifically open wire guide 3, closed wire guide 4, and wire-position sensor 7, can be integrated into the head. All the functions of known wire-guide heads are retained in accordance with the invention. The head also accommodates an unillustrated wire cutter and an also unillustrated sensor that detects the presence of a wire.

I claim:

1. An apparatus for electro-erosive cutting, comprising a wire cathode advancing through a combination of wire guides being located upstream of the workpiece in terms of the direction of the advancing wire, wherein the combination of guides comprises an open notched, non-surrounding wire guide, and a closed wire guide surrounding the wire and having the form of a torus.

2. The apparatus of claim 1, wherein the combination of wire guides is accommodated in a single wireguide head.

3. The apparatus of claim 1, further comprising a wire-position sensor.

4. The apparatus of claim 3, wherein the wire-position sensor is accommodated between the open wire guide and the closed wire guide.

5. The apparatus of claim 1, further comprising a a water-jet wire threader.

6. The apparatus of claim 1, wherein the closed wire guide has an opening through the center which is at least twice as wide as the wire thickness.

7. The apparatus of claim 6, wherein the opening through the center of the closed wire guide is 10 times wider than the wire thickness.

8. The apparatus of claims 1, wherein the open wire guide is far enough from the closed wire guide for the wire to be guided by the open wire guides while performing a cut at conical angles of up to approximately 2° and by the closed wire guides at more obtuse conical angles.

9. The apparatus of claim 1, further comprising computerized numerical controls, that automatically calculate the distance between the open wire guides and the closed wire guide in accordance with a program for a particular conical angle.

10. The apparatus of claim 9, further comprising a detector that detects contact between the wire and the close wire guide and calculates the distance between the closed wire guide and the open wire guide or guides, and forwards the result to the controls.

11. The apparatus of claim 9, wherein the control corrects the position of the wire inside the closed wire guide to ensure that the cut always corresponds with the program when the conical angle is more obtuse than 2°.

12. The apparatus of claim 1, wherein the closed wire guide surrounding the wire is facing the workpiece.

13. An apparatus for electro-erosive cutting, comprising a wire cathode advancing through two combinations of wire guides, the first combination being located upstream of a workpiece and the second combination being downstream of the workpiece, wherein each combination of guides comprises an open notched, non-surrounding wire guide and a closed wire guide surrounding the wire and having the form of a torus.

14. The apparatus of claim 13, wherein the closed wire guide surrounding the wire of each combination is facing the workpiece.

* * * * *